United States Patent [19]

Saito et al.

[11] Patent Number: 5,581,786
[45] Date of Patent: Dec. 3, 1996

[54] METHOD AND APPARATUS FOR ASSIGNING DRIVE NUMBERS TO HARD DISK DRIVES COUPLED TO A COMPUTER SYSTEM

[75] Inventors: Toshimitsu Saito; Mayumi Oka; Atsuhiro Ootake; James Mason, all of Tokyo, Japan

[73] Assignee: Kabushiki Kaisha Toshiba, Kawasaki, Japan

[21] Appl. No.: 383,692

[22] Filed: Jan. 4, 1995

Related U.S. Application Data

[63] Continuation of Ser. No. 127,116, Sep. 27, 1993, abandoned, which is a continuation of Ser. No. 719,497, Jun. 24, 1991, abandoned.

[30] Foreign Application Priority Data

Jun. 25, 1990 [JP] Japan ................. 2-166215
Jun. 25, 1990 [JP] Japan ................. 2-166216

[51] Int. Cl.⁶ ............................................. G06F 13/10
[52] U.S. Cl. ................... 395/828; 395/829; 395/442; 395/438
[58] Field of Search ............................ 395/828, 829, 395/700

[56] References Cited

U.S. PATENT DOCUMENTS

| | | | |
|---|---|---|---|
| 4,583,194 | 4/1986 | Cage | 364/419 |
| 4,833,554 | 5/1989 | Dalziel et al. | 360/98.04 |
| 4,866,601 | 9/1989 | Dulac et al. | 395/700 |
| 4,914,656 | 4/1990 | Dunphy, Jr. et al. | 371/10.2 |
| 4,982,324 | 1/1991 | McConaughy et al. | 395/200 |
| 5,014,193 | 5/1991 | Garner et al. | |
| 5,018,095 | 5/1991 | Nissimov | 395/425 |
| 5,058,004 | 10/1991 | Ravid | 395/275 |
| 5,065,262 | 11/1991 | Blackborow et al. | 360/75 |
| 5,075,805 | 12/1991 | Peddle et al. | 360/61 |
| 5,097,439 | 3/1992 | Patriquin et al. | 395/425 |
| 5,113,497 | 5/1992 | Dewa | 395/275 |
| 5,153,817 | 10/1992 | Hosoi et al. | |

FOREIGN PATENT DOCUMENTS

| | | |
|---|---|---|
| 0314093 | 5/1989 | European Pat. Off. |
| 2188761 | 10/1987 | United Kingdom |
| WO90/06554 | 6/1990 | WIPO |

OTHER PUBLICATIONS

IBM Technical Disclosure Bulletin, vol. 29, No. 1, Jun. 1986, p. 177, "Method To Display The System Configuration Of A Personal Computer".

*Primary Examiner*—Krisna Lim
*Attorney, Agent, or Firm*—Oblon, Spivak, McClelland, Maier & Neustadt, P.C.

[57] ABSTRACT

In a computer system to which externally- and internally-set hard disk drives can be coupled, a drive number is set to the externally-set hard disk drive and/or internally-set hard disk drive in accordance with a coupling state of the externally- and internally-set hard disk drives and a swithing state of a dip switch of the externally-set hard disk drive. When the externally-set hard disk drive and/or internally-set hard disk drive are/is coupled to the computer system, pop-up menu data for the externally-set hard disk drive and/or internally-set hard disk drive is added to the normal pop-up menu data. A pop-up menu is therefore displayed using the normal pop-up menu data including the pop-up menu data for the externally-set hard disk drive and/or internally-set hard disk drive.

11 Claims, 9 Drawing Sheets

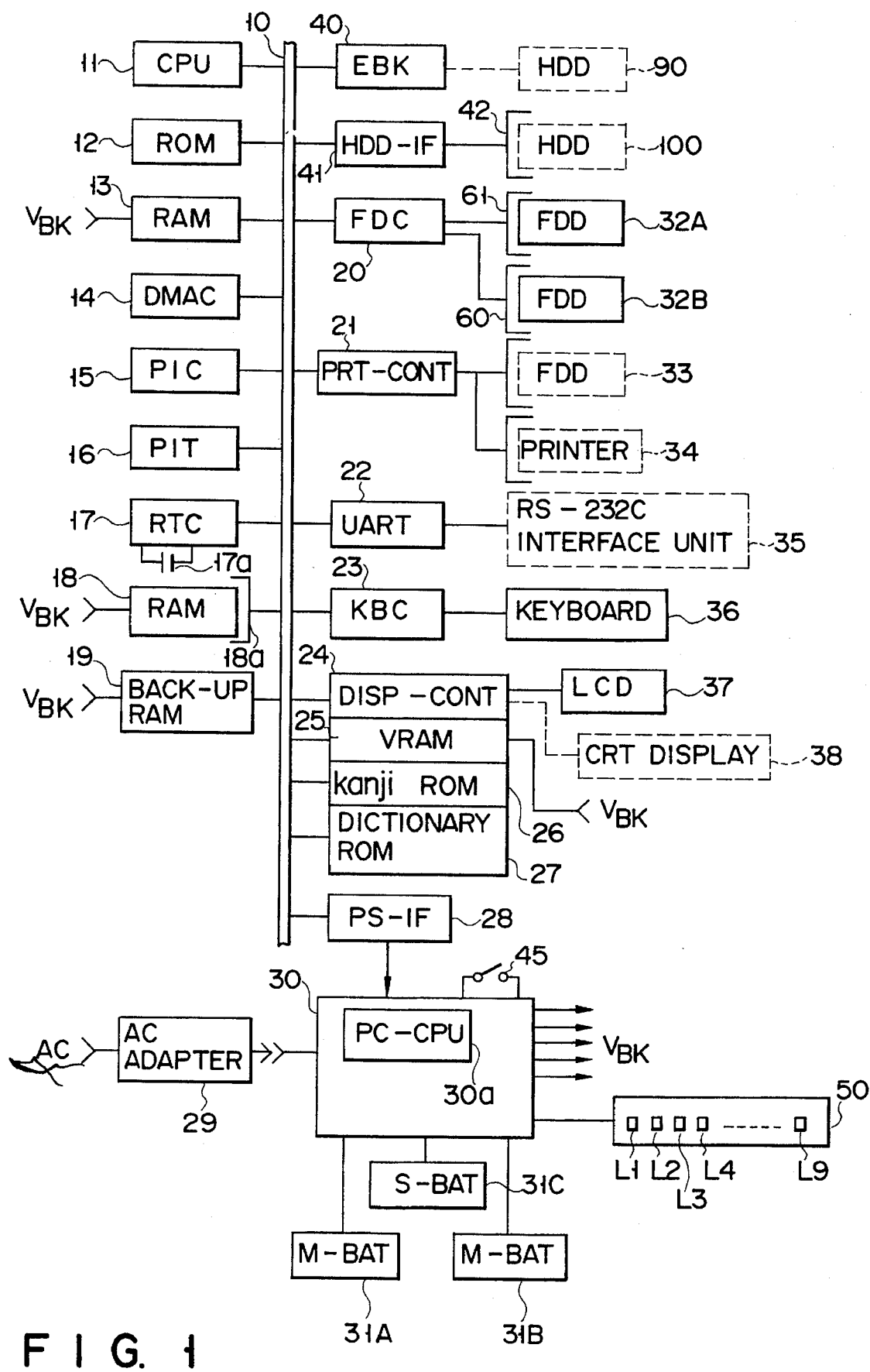
F I G. 1

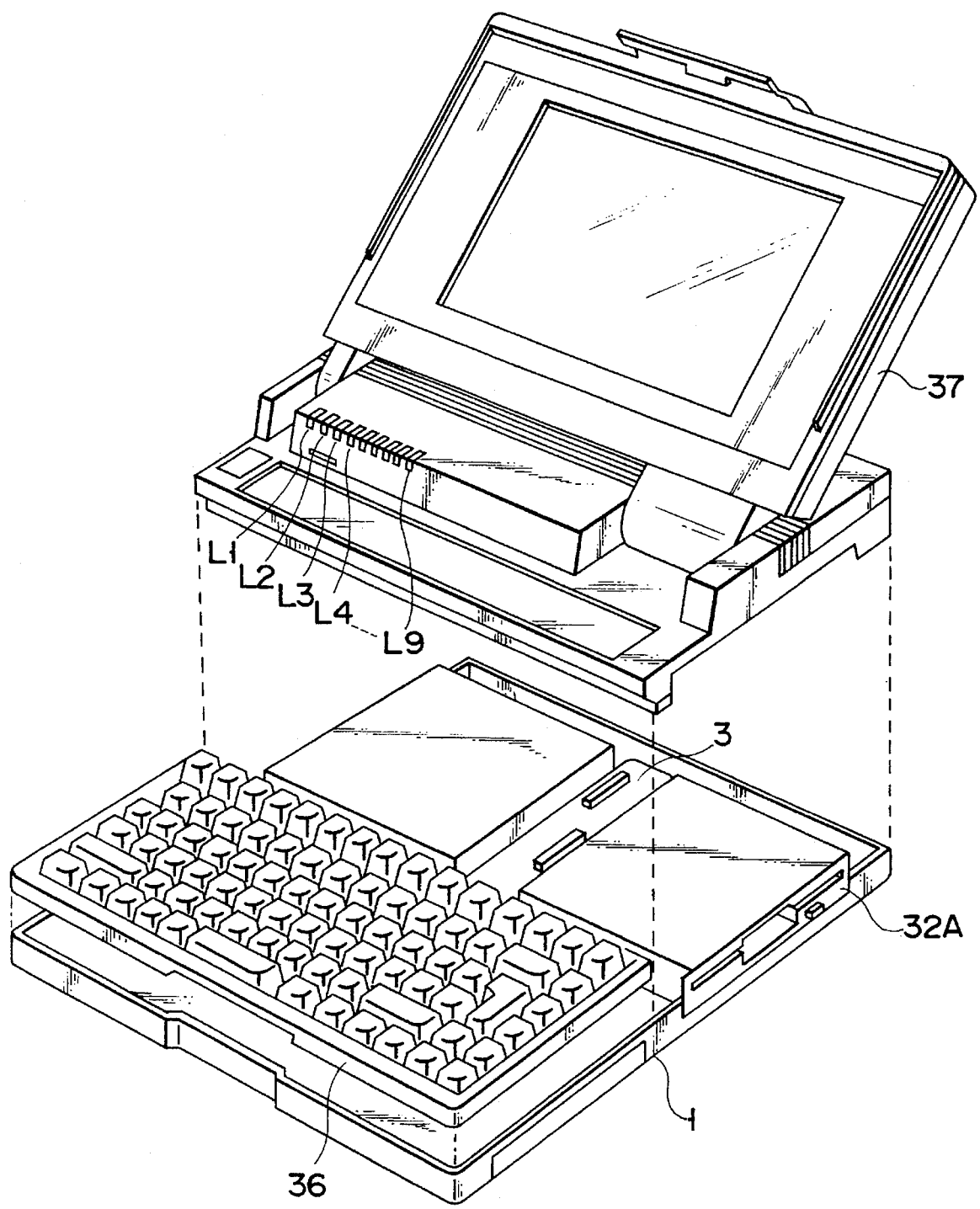
F I G. 3

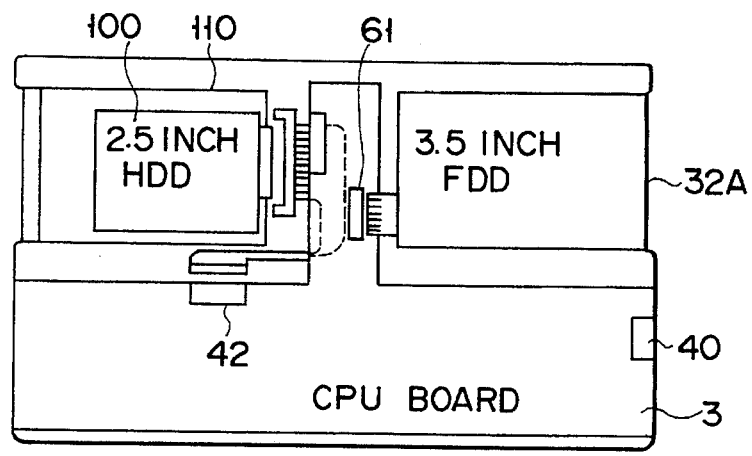
F I G. 6
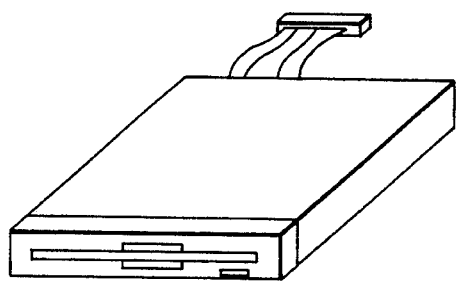
F I G. 7
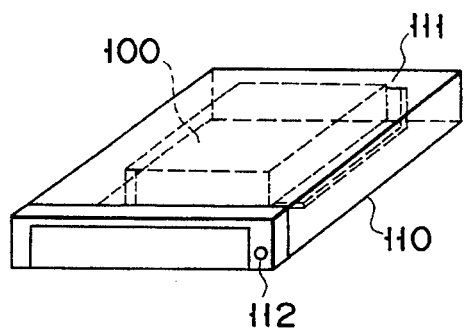
F I G. 8
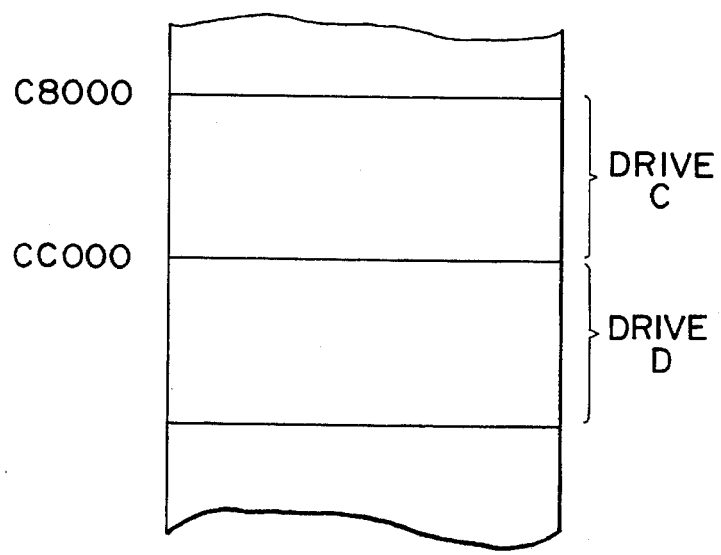
F I G. 9

METHOD AND APPARATUS FOR ASSIGNING DRIVE NUMBERS TO HARD DISK DRIVES COUPLED TO A COMPUTER SYSTEM

This application is a Continuation of application Ser. No. 08/127,116, filed on Sep. 27, 1993, now abandoned, which is a Continuation of application Ser. No. 07/719,497, filed on Jun. 24, 1991, now abandoned.

BACKGROUND OF THE INVENTION

1. Field of the Invention

The present invention relates to a method and an apparatus for controlling drives coupled to a computer system.

2. Description of the Related Art

Various portable lap-top type personal computers which can be driven by batteries have recently been developed. These personal computers each include a magnetic recording device such as a floppy disk drive and a hard disk drive.

In order to advance the system of such a lap-top type personal computer, a magnetic recording device such as a floppy disk drive and a hard disk drive is externally set. Since, therefore, the externally-set magnetic recording device needs to be coupled to the body of the personal computer, the characteristics of the lap-top type computer, such as miniaturization, lightness and portability are lost. Since a connecter and a cable are used to couple the externally-set magnetic recording device to the body of the personal computer, the manufacturing cost of the computer increases and the reliability thereof decreases.

In a conventional computer including a hard disk drive, the hard disk drive is inherent in the computer and fixed therein, Information stored in the hard disk drive cannot be utilized directly by another computer.

When an externally-set hard disk drive is coupled to the body of a computer, it cannot be access-controlled when necessary since there is neither a device capable of accessing the externally-set hard disk drive in place of an internally-set hard disk drive nor a device capable of accessing the externally-set hard disk drive in addition to the internally-set hard disk drive.

In a computer to which an externally-set hard disk drive can be coupled, programs, data and the like must be stored beforehand in the computer system in order to display a pop-up menu including information on the externally-set hard disk drive.

Consequently, devices capable of controlling an externally-set device coupled to a personal computer according to their purpose of usage, are demanded.

SUMMARY OF THE INVENTION

It is an object of the present invention to provide a method and system for controlling a drive coupled to a computer system.

According to one aspect of the present invention, there is provided a computer system comprising: a computer body; at least one hard disk drive to be coupled to the computer body, a hard disk drive to be externally coupled to the computer body and having a switch for designating a drive number; and determination and set means for determining whether or not the drive number designated by the switch is a first drive number when the hard disk drive is externally coupled to the computer body, determining whether or not the hard disk drive is externally coupled to the computer body when the hard disk drive is internally coupled to the computer body, and setting the drive number to the coupled hard disk drive in accordance with determination results to obtain memory address regions of the coupled hard disk drive.

According to another aspect of the present invention, there is provided a computer system comprising: a computer body having a computer memory for storing normal pop-up menu data; at least one hard disk drive to be coupled to the computer body and having a drive memory for storing drive pop-up menu data for the hard disk drive; means for determining whether or not the hard disk drive is coupled to the computer body, reading out the drive pop-up menu data from the drive memory of the coupled hard disk drive when the hard disk drive is coupled to the computer body, reading out the normal pop-up menu data from the computer memory, and adding the drive pop-up menu data to the normal pop-up menu data to obtain added pop-up menu data when the hard disk drive is coupled to the computer body: and display means for displaying a pop-up menu using one of the normal pop-up menu data and the added pop-up menu data in accordance with a determination result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a configuration of a computer system according to an embodiment of the present invention;

FIG. 3 is a perspective view showing an appearance and a configuration of the computer system in which a display is opened;

FIG. 6 is a view showing an arrangement of a floppy disk drive and a hard disk drive included in the computer system;

FIG. 7 is a view showing an appearance of a floppy disk drive;

FIG. 8 is a view showing an appearance and a configuration of a hard disk drive;

FIG. 9 is a view showing memory address areas of drives C and D to be set;

DETAILED DESCRIPTION OF THE PREFERRED EMBODIMENTS

An embodiment of the present invention will be described with reference to the accompanying drawings.

Figure 2:
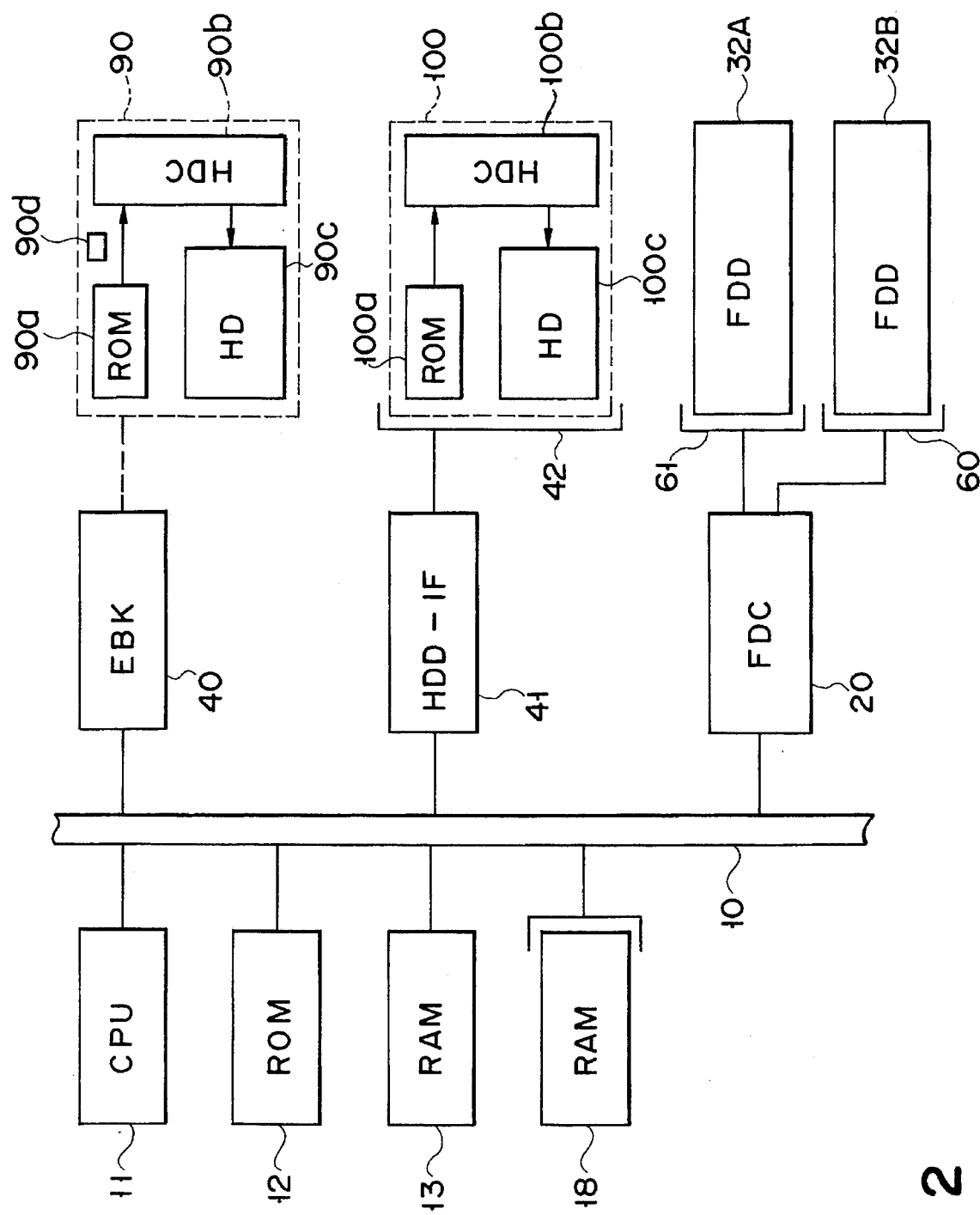
FIG. 2 is a view showing main components of the computer system according to the embodiment of the present invention.

FIG. 1 is a block diagram showing a configuration of a computer system according to an embodiment of the present invention. FIG. 2 is a view showing main components of the computer system.

The computer system shown in FIG. 1 comprises a system bus 10, a central processing unit (CPU) 11 for controlling the entire computer system, a read only memory (ROM) 12 for storing control programs for the computer system, an internally set hard disk drive 100, to be described later, pop-up menu data, and the like, a random access memory (RAM) 13 for storing data to be processed, a direct memory access controller (DMAC) 14 for direct memory access control, a programmable interrupt controller (PIC) 15 which can be set by programs, a programmable interval timer (PIT) 16 which can be set by programs, a real time clock (RTC) 17 used as a timer module having a driving battery 17a, a large-capacity extended RAM 18 connectable to a card slot 18a, and a backup RAM 19 for storing data or the like to execute a resume process.

The computer system also comprises a floppy disk controller (FDC) 20. Floppy disk drives 32A and 32B are connected to the FDC 20 by connecters 61 and 60, respectively and controlled by the FDC 20. Instead of the 3.5-inch floppy disk drive 32B, a hard disk drive of, for example, 2.5 inches can be coupled to the computer system of the present invention. Accordingly, the computer system can be easily advanced. The method of coupling the hard disk drive to the computer system will be described later.

The computer system further comprises a printer controller (PRT-CONT) 21, a universal asynchronous receiver/transmitter (UART) 22 used as an input and output interface, a keyboard controller (KBC) 23, a display controller (DISP-CONT) 24, a video RAM (VRAM) 25, a kanji ROM 26, a dictionary ROM 27, a power supply interface (PS-IF) 28, an alternating current (AC) adapter 29, a power supply circuit 30 having a power control CPU (PC-CPU) 30a, main batteries (M-BAT) 31A and 31B, a sub-battery (S-BAT) 31C, a keyboard 36, a liquid crystal display (LCD) 37, and power switch 45.

A 5-inch externally-set floppy disk drive 33 and a printer 34 are selectively coupled to the PRT-CONT 21 by a connector. An RS-232C interface unit 35 is connected to the UART 22, if necessary. The KBC 23 controls a key input from the keyboard 36 arranged on the body of the computer system.

The DISP-CONT 24 controls the swingable LCD 37 attached to the body of the computer system, or a cathode ray tube (CRT) display 38 selectively connected to the DISP-CONT 24. A backup voltage $V_{BK}$ is applied to the VRAM 25. The kanji ROM 26 is used to convert a kanji character code into a kanji character pattern. The dictionary ROM 27 is used to perform kana-to-kanji conversion.

The PS-IF 28 executes serial data transmission to the PC-CPU 30a of the power supply circuit 30. The AC adapter 29 rectifies and smooths an AC voltage from an externally-set power supply and then supplies a predetermined direct current (DC) voltage to the power supply circuit 30. The power supply circuit 30 supplies a driving voltage to each of the components of the computer system.

The M-BATs 31A and 31B can be charged and are each formed as a packed unit attachable/detachable to/from the body of the computer system. When the computer system is driven, one of the M-BATs is selected by the power supply circuit 30, and the driving voltage is supplied from the selected battery to the components. If the battery supplying the driving voltage reaches the limits of usage, that is, if the battery is in a low battery state, the battery is changed to the other battery, by which the driving voltage is supplied. Like these M-BATs 31A and 31B, the S-BAT 31C can be charged and is used to supply the backup voltage $V_{BK}$ to the components such as RAM 13, RAM 18, backup RAM 19, and VRAM 25, which need to be backed up.

The computer system further comprises an extended bus connector (EBC) 40, a hard disk drive interface 41, and a system state display section 50 for displaying the states of the system.

The EBC 40 is used to extend the functions of the computer system. An externally-set hard disk drive 90 is selectively connected to the EBC 40. Otherwise, an extended unit (not shown) having various types of components such as a keyboard, a CRT display, a memory, and a connecting portion for coupling the extended unit with the computer system, can selectively be connected to the EBC 40.

As illustrated in FIG. 2, the externally-set hard disk drive 90 includes a ROM 90a, a hard disk controller (HDC) 90b, a hard disk (HD) 90c, and a dip switch 90d. The ROM 90a stores routine programs for the hard disk drive 90, pop-up menu data, and the like. The HDC 90b drives the HD 90c. The dip switch 90d is used to assign a drive number to the hard disk drive 90 an address of the memory map (as described later) is specified by the state (e.g., on/off) of the dip switch 90d.

The hard disk drive interface 41 is used to couple an internally-set hard disk drive 100 to the body of the computer system by a connecter 42.

The hard disk drive 100 includes a ROM 100a, a hard disk controller (HDC) 100b, and a hard disk (HD) 100c. The ROM 100a stores pop-up menu data, and the like. The HDC 100b drives the HD 100c.

The system state display section 50 includes a plurality of light emitting diodes (LEDs) L1 to L9 operated in accordance with control of the PC-CPU 30a of the power supply circuit 30.

Figure 4:
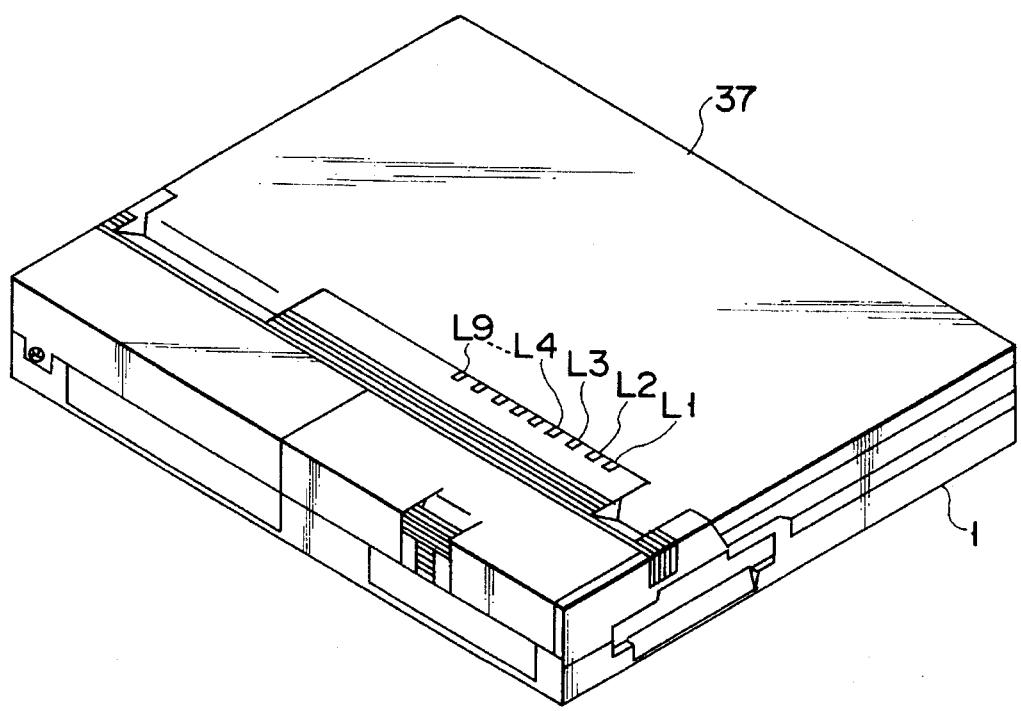
FIG. 4 is a perspective view showing an appearance of the computer system in which the display is closed.

FIG. 3 is a perspective view showing an appearance and a configuration of the computer system in which a display is opened, and FIG. 4 is a perspective view showing an appearance of the computer system in which the display is closed. As shown in FIG. 3, a CPU board 3 and a keyboard 36 are arranged on the body 1 of the computer system.

Figure 5:
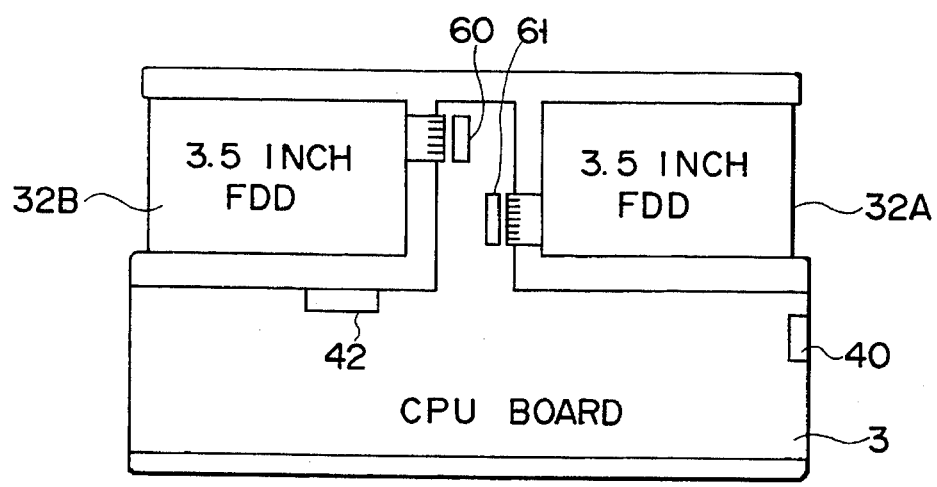
FIG. 5 is a view showing an arrangement of two floppy disk drives included in a computer system.

FIG. 5 is a view showing an arrangement of two 3.5-inch floppy disk drives 32A and 32B included in a computer system.

In order to advance the computer system (including two floppy disk drives) as shown in FIG. 5 to a computer system (including a floppy disk drive and a hard disk drive) as shown in FIG. 6, the floppy disk drive 32B is disconnected from the connecter 60 and a 2.5-inch hard disk drive 100 is connected to the connecter 42. The computer system including the floppy disk drives 32A and 32B can thus be changed to the computer system including the floppy disk drive 32A and the hard disk drive 100.

FIG. 7 is a view showing an appearance of the floppy disk drive, and FIG. 8 is a view showing an appearance and a configuration of the hard disk drive 100. The hard disk drive 100 has a packed structure and is housed in a housing 110 having substantially the same shape as that of the floppy disk drive shown in FIG. 7. The hard disk drive 100 is placed on a tray 111, and it can be taken out from the housing 110 by a button 112 with the hard disk drive 100 placed on the tray 111. The hard disk drive 100 housed in the housing 110 can be connected to the EBC 40 as the externally-set hard disk drive 90.

The externally-set hard disk drive can thus be used in a plurality of computer systems. Furthermore, specific software, a large amount of data, etc. can be used in the computer systems.

When the externally-set hard disk drive 90 is connected to the EBC 40, it needs to be correctly controlled. In the computer system of the present invention, therefore, the floppy disk drive and hard disk drive are specified by drive numbers A to D to control these disk drives. If the floppy disk drives 32A and 32B are included in the computer system of the present invention as shown in FIG. 5, the floppy disk drives 32A and 32B are specified by the drive numbers A and B, respectively. If the hard disk drive 100 is included in the computer system in place of the floppy disk drive 32B as shown in FIG. 6, the floppy disk drive 32A is specified by the drive number A.

The hard disk drive 100 is specified by the drive number C (80H) or D (81H). The selection of the drive number C or D depends upon whether the externally-set hard disk drive 90 is connected to the EBC 40 or not. The externally-set hard disk drive 90 is specified by the drive number C or D in accordance with the switching states of the dip switch 90d.

If the externally-set hard disk drive 90 is specified by the drive number C (80H), as shown in FIG. 9, a predetermined area beginning with address C8000 of a memory map of the computer system is assigned as a memory address area of the HD 90c. If the externally-set hard disk drive 90 is specified by the drive number D (81H), a predetermined area beginning with address CC000 of the memory map is assigned as a memory address area of the HD 90c.

Figure 10A:
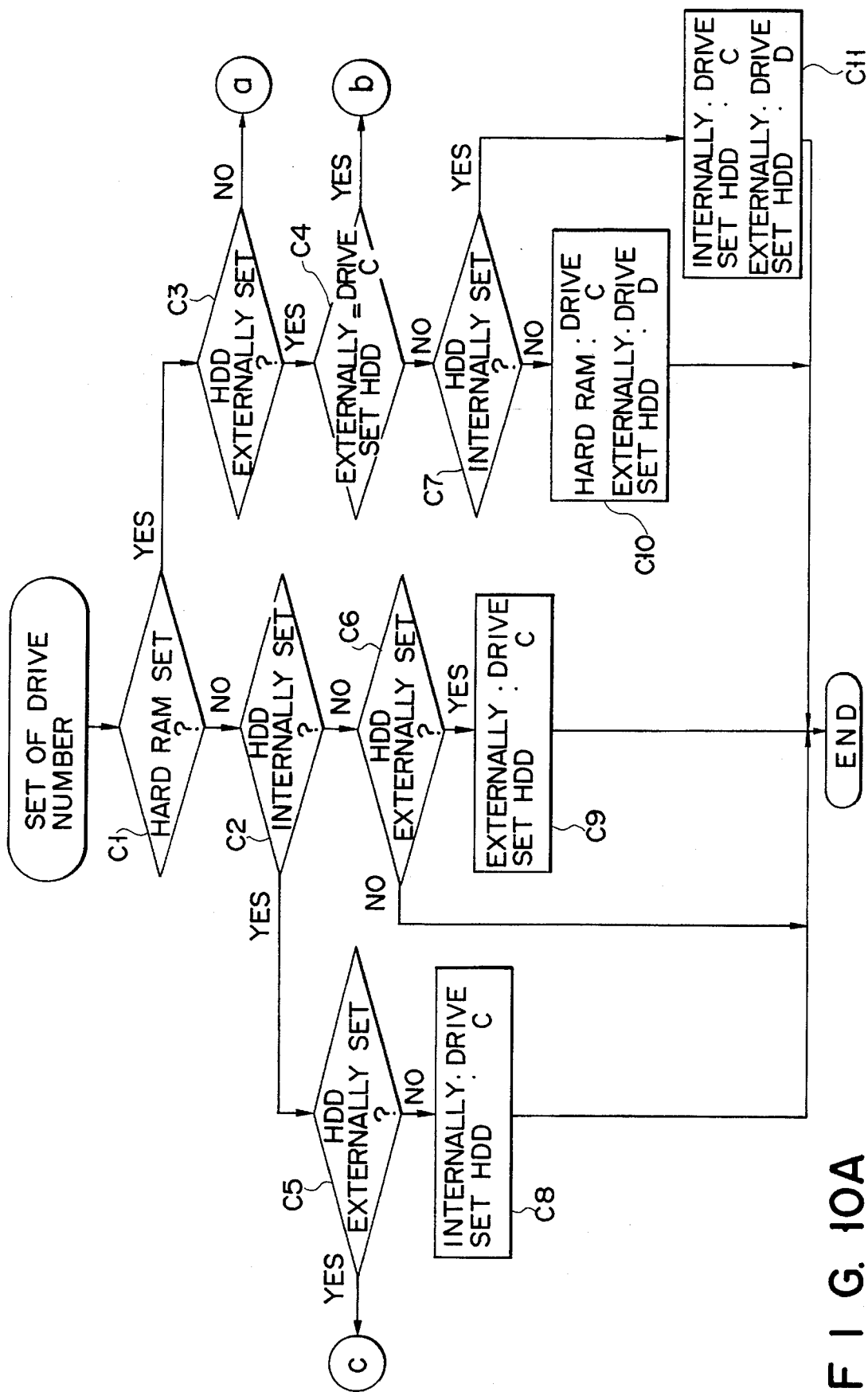
FIGS. 10A and 10B are flowcharts for setting the numbers of the drives.
Figure 10B:
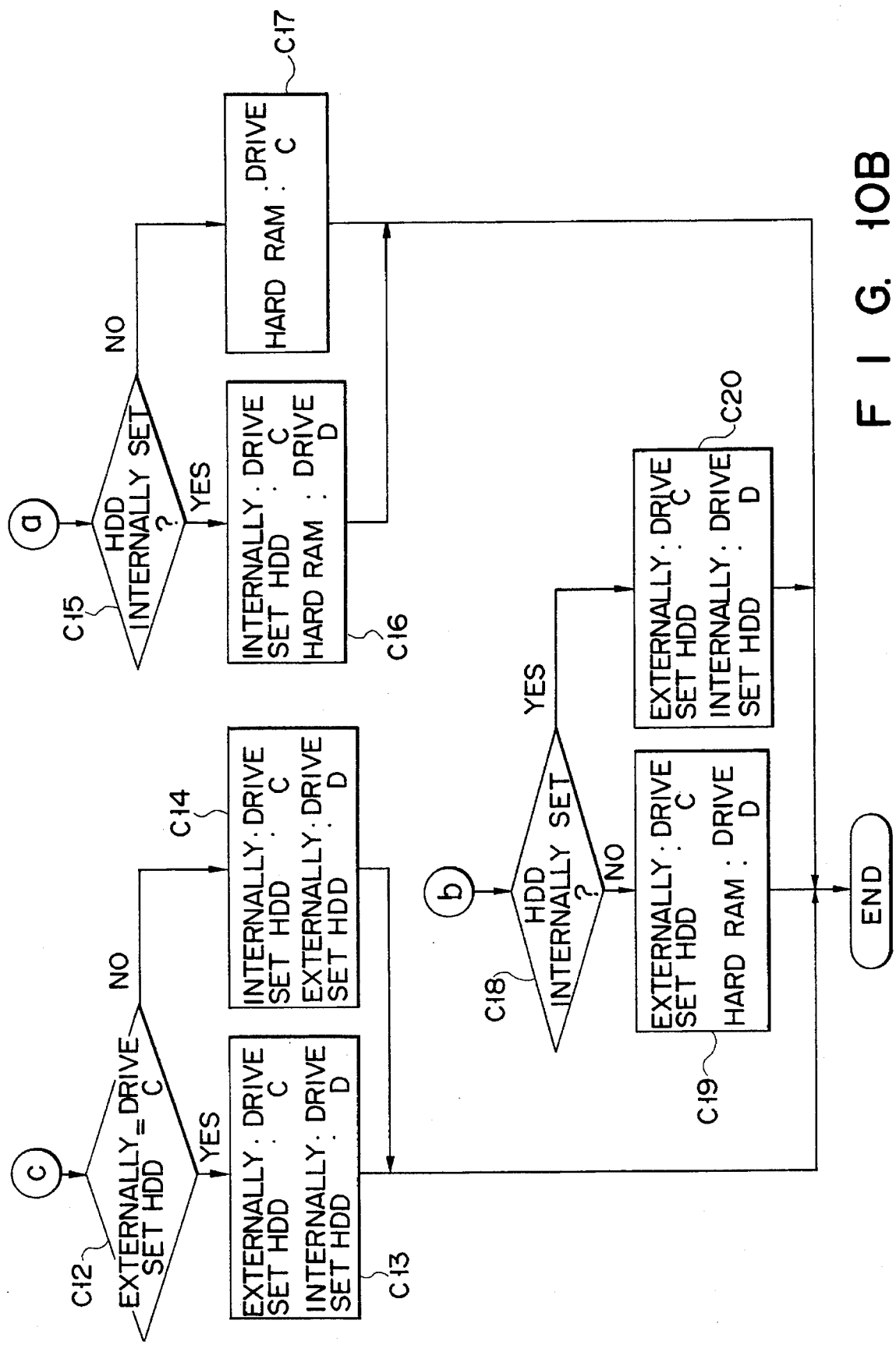

When an externally-set hard disk drive and/or an internally-set hard disk drive are/is coupled to a computer system including at least one of floppy disk drives, or when a hard RAM is set in the computer system, drive numbers are set by the CPU 11 in accordance with the flowcharts shown in FIGS. 10A and 10B to use the memories of these disk drives. The hard RAM is set in predetermined memory areas of the RAMs 13 and 18 if necessary.

In step C1, it is determined whether the hard RAM is set or not. When the hard RAM is not set, it is determined in step C2 whether a hard disk drive is internally set in the body 1 of the computer system (see FIG. 6).

When no hard disk drive is internally set in step C2, it is determined in step C6 whether a hard disk drive is externally set. When the hard disk drive is externally set in step C6, drive C (drive number 80H) is set to the externally-set hard disk drive (step C9).

When the hard disk drive is internally set in the step C2, it is determined in step C5 that the hard disk drive is externally set. When the hard disk drive is not externally set in step C5, drive C (drive number 80H) is set to the internally-set hard disk drive (step C8).

When the hard disk drive is externally set in step C5, it is determined in step C12 whether the drive C is set to the externally-set hard disk drive (step C12). The drive C is set by the dip switch 90d of the externally-set hard disk drive 90.

When the externally-set hard disk drive is specified by the drive C in step C12, the drive C (drive number 80H) is set to the externally-set hard disk drive and the drive D (drive number 81H) is set to the internally-set hard disk drive (step C13). When the externally-set hard disk drive is not specified by the drive C in step C12, the drive C (drive number 80H) is set to the internally-set hard disk drive and the drive D (drive number 81H) is set to the externally-set hard disk drive (step C14).

When the hard RAM is set in step C1, it is determined whether the hard disk drive is externally set or not (step C3). When the hard disk drive is externally set in step C3, it is determined whether the externally-set hard disk drive is specified by the drive C (step C4). when the externally-set hard disk drive is not specified by the drive C in step C4, it is determined whether the hard disk drive is internally set or not (step C7).

If the hard disk drive is internally set in step C7, the drive C (drive number 80H) is set to the internally-set disk drive, and the drive D (drive number 81H) is set to the externally-set hard disk drive (step C11). No drives are therefore set to the hard RAM. If the hard disk drive is not internally set in step C7, the drive C (drive number 80H) is set to the hard RAM, and the drive D (drive number 81H) is set to the externally-set hard disk drive (step C10).

When the hard disk drive is not externally set in step C3, it is determined in step C15 whether the hard disk drive is internally set or not. If the hard disk drive is internally set in step C15, the drive C (drive number 80H) is set to the internally-set hard disk drive and the drive D (drive number 81H) is set to the hard RAM (step C16). If the hard disk drive is not internally set in step C15, the drive C (drive number 80H) is set to the hard RAM (step C17).

When the externally-set hard disk drive is specified by the drive C in step C4, it is determined in step C18 whether the hard disk drive is internally set or not. If the hard disk drive is internally set in step C18, the drive C (drive number 80H) is set to the externally-set hard disk drive, and the drive D (drive number 81H) is set to the internally-set hard disk drive (step C20). No drives are therefore set to the hard RAM. If the hard disk drive is not internally set in step C18, the drive C (drive number 80H) is set to the externally-set hard disk drive, and the drive D (drive number 81H) is set to the hard RAM (step C19).

As described above, the drives are set in accordance with a coupling state of the hard disk drive to the computer system and a setting state of the hard RAM.

Figure 11:
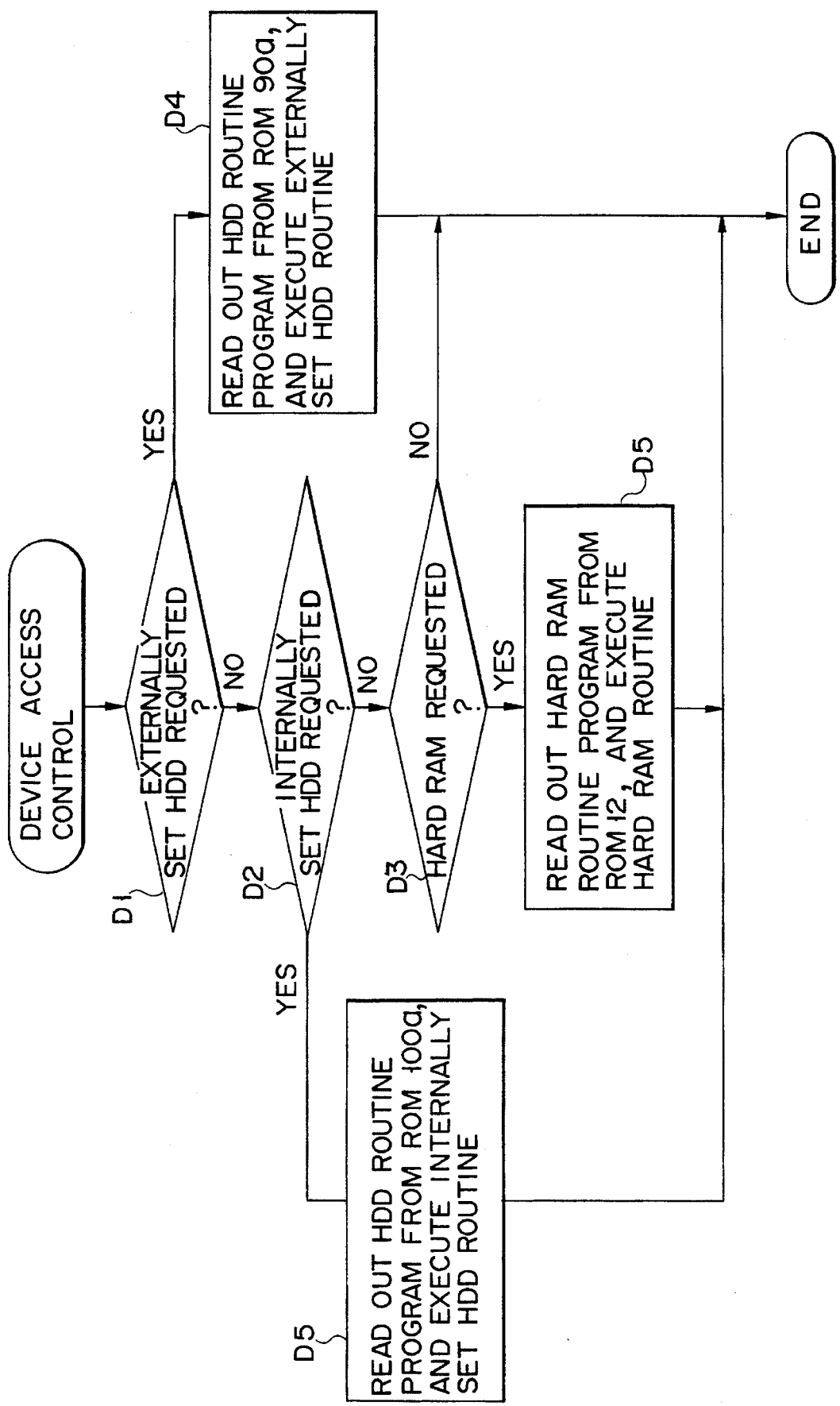
FIG. 11 is a flowchart for access-controlling a device.

After the drives are set, the devices are access-controlled by the CPU 11 in accordance with the flowchart shown in FIG. 11.

In step D1, it is determined whether access to the externally set hard disk drive has been requested. When the access is requested, a hard disk drive routine program is read out from the ROM 90a and then an externally-set hard disk drive routine is executed in accordance with the read-out routine program (step D4).

In step D2, it is determined whether access to the internally-set hard disk drive is requested or not. If the access is requested, a hard disk drive routine program is read out from the ROM 100a and then an internally-set hard disk drive routine is executed (step D5).

In step D3, it is determined whether the hard RAM is set or not. If the hard RAM is set, a hard RAM routine program is read out from the ROM 12 and a hard RAM routine is executed in accordance with the read-out routine program (step D6).

Figures 12, 13:
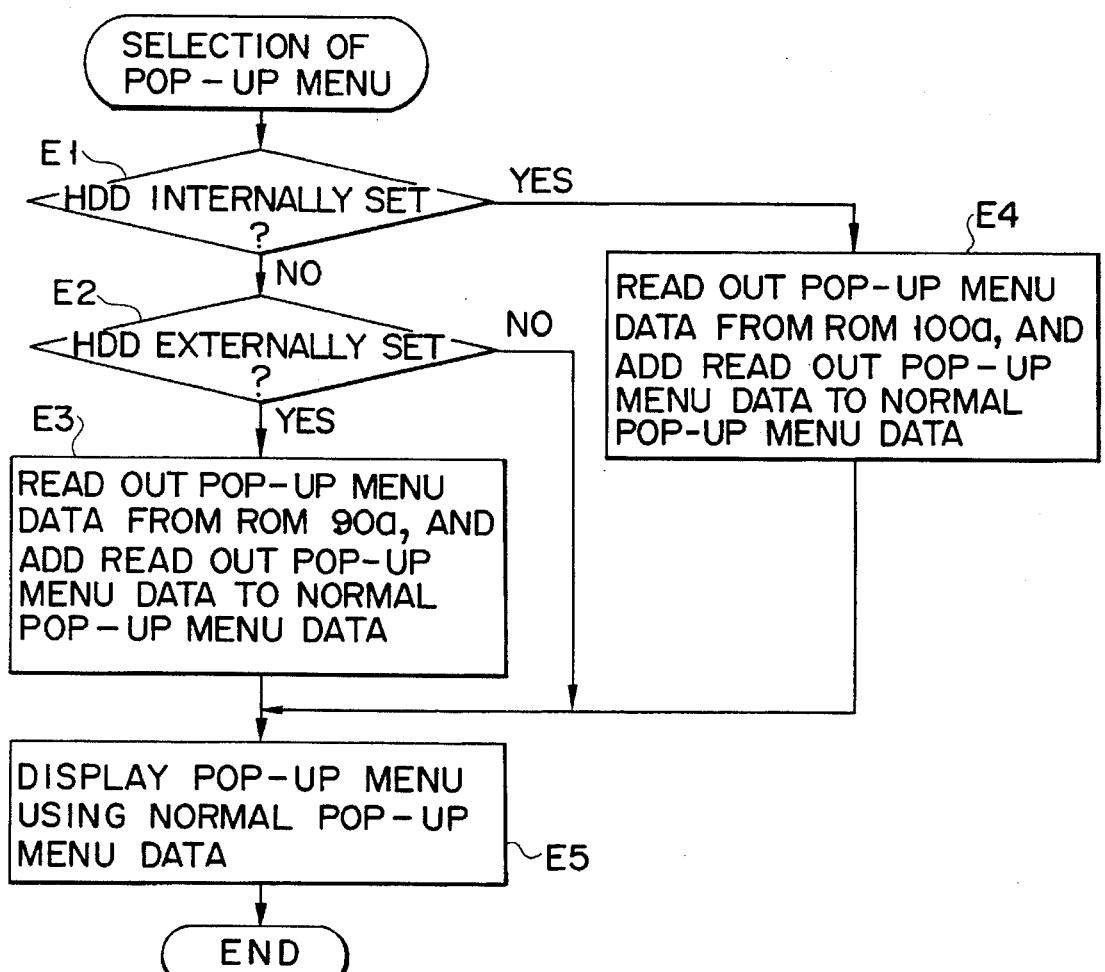
FIG. 12 is a view showing an example of displaying a pop-up menu.
FIG. 13 is a flowchart for selecting the pop-up menu.

In a computer system having a floppy disk only, usually, a pop-up menu as shown in FIG. 12(*a*) is displayed on the LCD 37 or the like. If, however, a hard disk drive is externally set to the computer system, pop-up menu data is read out from a ROM of the externally-set hard disk drive and then added to normal pop-up menu data for displaying the pop-up menu shown in FIG. 12(a). A pop-up menu as shown in FIG. 12(b) is thus displayed on the LCD 37. In FIG. 12(b), the pop-up menu shows that the automatic power off time (Drt) of the externally-set hard disk drive is set to 5 minutes.

The selection of a pop-up menu in the CPU 11 will be described according to the flowchart shown in FIG. 13. The pop-up menu is selected by inputting a command using a predetermined key of the keyboard 36.

When a command for displaying the pop-up menu is input from the keyboard 36, it is determined in step E1 whether the hard disk drive is internally set in the computer system, i.e., whether the hard disk drive 100 is connected to the connecter 42.

For example, the connection state is determined as follows. After the drives are set and before the pop-up menu is selected, information for the device number of each device is automatically set to the head portion of a memory address area assigned to the device, as shown in FIG. 9. If the drive C is set to the hard disk drive 100, information for the device number of the hard disk drive 100 can be obtained by reading out information for the head portion after address C8000. It is thus possible to determine that the hard disk drive 100 is connected to the connecter 42.

When it is determined in step E1 that the hard disk drive 100 is not connected to the connecter 42, i.e., when information for the device number of the hard disk drive 100 is not acquired, it is determined in step E2 whether the hard disk drive is externally set to the computer system, i.e., it is determined therein whether the externally-set hard disk drive 90 is connected to the EBC 40. This determination of the connection state also depends upon whether information for the device number of the hard disk drive 90 is acquired or not.

When it is determined in step E2 that the externally-set disk drive 90 is not connected to the EBC 40, the pop-up menu is displayed using normal pop-up menu data stored in the ROM 12 in step E5 (see FIG. 12(a)).

When it is determined in step E2 that the externally-set hard disk drive 90 is connected to the EBC 40, pop-up menu data for the hard disk drive 90 is read out from the ROM 90a of the hard disk drive 90 and the read-out pop-up menu data is added to the normal pop-up menu data (step E3). In step E5, the pop-up menu is displayed using the normal pop-up menu data to which the pop-up menu data for the hard disk drive 90 is added (see FIG. 12(b)).

When it is determined in step E1 that the hard disk drive 100 is connected to the connecter 42, pop-up menu data for the hard disk drive 100 is read out from the ROM 100a of the hard disk drive 100 and the read-out pop up menu data is added to the normal pop-up menu data (step E4). In step E5, the pop-up menu is displayed using the normal pop-up menu data to which the pop-up menu data for the hard disk drive 100 is added (see FIG. 12(b)).

Consequently, the pop-up menu data for the hard disk drive is automatically read out from the ROM of the hard disk drive and then displayed together with the normal pop-up menu data only when the hard disk drive is coupled to the computer system, without storing the pop-up menu data for the hard disk drive beforehand in the ROM 12.

If the externally- and internally-set hard disk drives are coupled to the computer system, the pop-up menu data for the internally-set hard disk drive is read out from the ROM of the internally-set hard disk, the pop-up menu is displayed using the read out pop-up menu data. However, the pop-up menu can precedently be displayed using the pop-up menu data for the externally-set hard disk drive.

As described above, in the present invention, when the externally-set hard disk drive and/or the internally-set hard disk drive are/is coupled to the computer system, the drives are set to the respective devices in accordance with their objects of use. Accordingly, access control can efficiently be executed.

When the hard disk drive is coupled to the computer system, since the pop-up menu data for the hard disk drive is stored in the ROM of the hard disk drive, the pop-up menu data is added to the normal pop-up menu data, and the pop-up menu can be displayed using the normal pop-up menu data including the pop-up menu data for the hard disk drive. In the computer system of the present invention, therefore, the pop-up menu data for the hard disk drive to be coupled to the computer system, need not be stored beforehand and the pop-up menu can be displayed according to whether or not the hard disk drive is coupled to the computer system.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A computer system, comprising:

a computer body including:
   a system bus;
   a central processing unit (CPU), coupled to the system bus, for controlling electronic components of the computer system;
   a first disk drive connected to the system bus through a disk drive connector;
   storage means coupled to the system bus, for storing control programs in the first disk drive to access data stored in the first disk drive; and
   a bus connector connected to the electronic components through the system bus;

a second disk drive connected to the computer body through the bus connector, the second disk drive including a disk for storing media information, a disk controller for controlling the disk, and means for storing programs to control the disk by the disk controller;

means for designating a desired disk drive number of the second disk drive;

first assignment means for assigning a designated disk drive number to the second disk drive in accordance with the desired disk drive number, when the second disk drive is connected to the bus connector, and for assigning a drive number which is different than the designated disk drive number to the first disk drive automatically using the desired disk drive number which has been designated for the second disk so as to identify each of the first and second disk drives; and second assignment means for assigning the control programs of the second disk drive in a memory map of the computer system in accordance with the disk drive numbers assigned by the first assignment means.

2. The computer system according to claim 1, wherein the first assignment means assigns the second disk drive to a drive number 80H when the first disk drive is disconnected from the disk drive connector.

3. The computer system according to claim 1, wherein the first assignment means assigns the first disk drive to a drive number 80H when the second disk drive is assigned to a drive number 81H in accordance with the designated disk drive number.

4. The computer system according to claim 1, wherein the first assignment means assigns the first disk drive to a drive number 81H when the second disk drive is assigned to a drive number 80H in accordance with the designated disk drive number.

5. A computer system according to claim 1, further comprising:

determining means for determining if the second disk drive is connected to the bus connector; and wherein the first assignment means assigns a predetermined disk drive number to the second disk drive only when the second disk drive is determined to be connected to the bus connector by the determining means.

6. The system according to claim 1, wherein said designating means includes a dip switch on said second disk drive.

7. In a computer system including a computer body having a system bus, a central processing unit (CPU), coupled to the bus, for controlling electronic components of the computer system, a first disk drive connected to the system bus through a disk drive connector and a bus connector connected to the electronic components through the system bus a second disk drive connected to the computer body through the bus connector, the second disk drive including a disk for storing information, a disk controller for driving the disk, means for storing programs to control the disk by the disk controller, a method for controlling the first and second disk drives comprising the steps of:

designating a desired disk drive number of the second disk drive by a user;

determining a designated disk drive number of the second disk drive in accordance with the desired disk drive number;

assigning the designated disk drive number to the second disk drive and assigning a disk drive number different from the designated disk drive number, to the first disk drive automatically using the desired disk drive number designated for the second disk drive to identify the first and second disk drives; and assigning the control programs of the second disk drive in a memory map of the computer system in accordance with the assignment step.

8. The method according to claim 7, wherein the step of assigning disk drive numbers assigns a drive number 81H to the first disk drive when the second disk drive is assigned to a drive number 80H in accordance with the designated disk drive number.

9. The method according to claim 7, wherein the step of assigning a disk drive numbers assigns the second disk to a drive number 80H when the first disk drive is disconnected from the disk drive connector.

10. The method according to claim 7, wherein the step of assigning disk drive numbers assigns the first disk drive to a drive number 80H when the second disk drive is assigned to a drive number 81H in accordance with the designated disk drive number.

11. The system according to claim 7, wherein said designating step includes a step of designating a desired disk drive number by a dip switch provided on said second disk drive.

* * * * *